United States Patent
Robinson et al.

(10) Patent No.: US 12,210,748 B1
(45) Date of Patent: Jan. 28, 2025

(54) PROVIDING CONSISTENT PERFORMANCE OF BLOCK-STORAGE VOLUMES IN CLOUD COMPUTING ENVIRONMENTS

(71) Applicant: Amazon Technologies, Inc., Seattle, WA (US)

(72) Inventors: Mark Robinson, Seattle, WA (US); Valentin-Gabriel Priescu, Seattle, WA (US); Farhan Tanvir Ali, Mountlake Terrace, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 83 days.

(21) Appl. No.: 18/067,646

(22) Filed: Dec. 16, 2022

(51) Int. Cl.
*G06F 3/06* (2006.01)
*G06F 9/455* (2018.01)

(52) U.S. Cl.
CPC ........... *G06F 3/0613* (2013.01); *G06F 3/064* (2013.01); *G06F 3/067* (2013.01); *G06F 9/45558* (2013.01); *G06F 2009/45579* (2013.01); *G06F 2009/45583* (2013.01)

(58) Field of Classification Search
CPC ...... G06F 3/061; G06F 3/0611; G06F 3/0613; G06F 3/0614; G06F 3/064; G06F 3/0653; G06F 3/0659; G06F 3/067; G06F 9/45579; G06F 2009/45579; G06F 2009/45583
USPC .................................. 710/5, 6, 74; 711/154
See application file for complete search history.

(56) References Cited

U.S. PATENT DOCUMENTS

| | | | |
|---|---|---|---|
| 9,304,951 B1* | 4/2016 | Chatterjee | G06F 11/3034 |
| 11,442,630 B1 | 9/2022 | Olson et al. | |
| 2004/0193397 A1* | 9/2004 | Lumb | G06F 13/105 703/24 |
| 2018/0173464 A1* | 6/2018 | Wongso | G06F 3/0614 |
| 2019/0332319 A1 | 10/2019 | Martin et al. | |
| 2019/0334801 A1* | 10/2019 | Dutta | H04L 43/16 |
| 2019/0394273 A1* | 12/2019 | Basak | G06F 3/067 |
| 2020/0050395 A1 | 2/2020 | Bavishi et al. | |

(Continued)

OTHER PUBLICATIONS

U.S. Appl. No. 11/442,630, filed Sep. 29, 2020, Olson et al.

(Continued)

*Primary Examiner* — Ilwoo Park
(74) *Attorney, Agent, or Firm* — Knobbe, Martens, Olson & Bear, LLP

(57) ABSTRACT

Systems and methods are provided for providing a consistent experience for users of cloud-based block storage volumes. While cloud storage aims to remove hardware considerations for an end user's experience, block storage performance can nevertheless vary according to the underlying hardware used to support a volume or the specific network location of that hardware. Embodiments of the present disclosure address that inconsistent performance by associating a volume with a performance profile that sets a target latency for the volume. A storage client can then monitor observed latency for the volume and inject synthetic latency into input/output operations for the volume as calculated via a proportional-integral-derivative algorithm, such that the observed latency matches the target within the performance profile. This enables the cloud provider to vary physical hardware or network configurations without effect on block storage performance from the point of view of an end user.

22 Claims, 6 Drawing Sheets

(56) References Cited

U.S. PATENT DOCUMENTS

2020/0125260 A1\* 4/2020 Pasupathy ............. G06F 3/0653
2021/0064286 A1\* 3/2021 Jung ..................... G06F 3/0611

OTHER PUBLICATIONS

U.S. Appl. No. 18/194,456, Dynamic Latency Shaping to Control Server Load, filed Mar. 31, 2023.
Cheng et al., Network performance isolation for latency-sensitive cloud applications, Future Generation Computer Systems 29 (2013) 1073-1084.

\* cited by examiner

PROVIDING CONSISTENT PERFORMANCE OF BLOCK-STORAGE VOLUMES IN CLOUD COMPUTING ENVIRONMENTS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual storage drives (sometimes referred to as "hard drives," "disk drives," or the like) for compute resources, object storage services that act as network-accessible data stores, and the like. A cloud service provider may manage the underlying hardware supporting such services, such that an end user need not do so. For example, a cloud service provider may use a variety of hardware of different revisions or manufacturers, and may update or alter that hardware periodically. The cloud service provider can also provide for the specifics of interconnecting that hardware, including building devices, internetworking those devices, etc. These changes are typically opaque to the end user, relieving the end user of dealing with issues such as hardware compatibility, networking configuration of physical devices, and the like. Cloud computing can thus significantly simplify development and deployment of computing processes.

DETAILED DESCRIPTION

Figure 1:
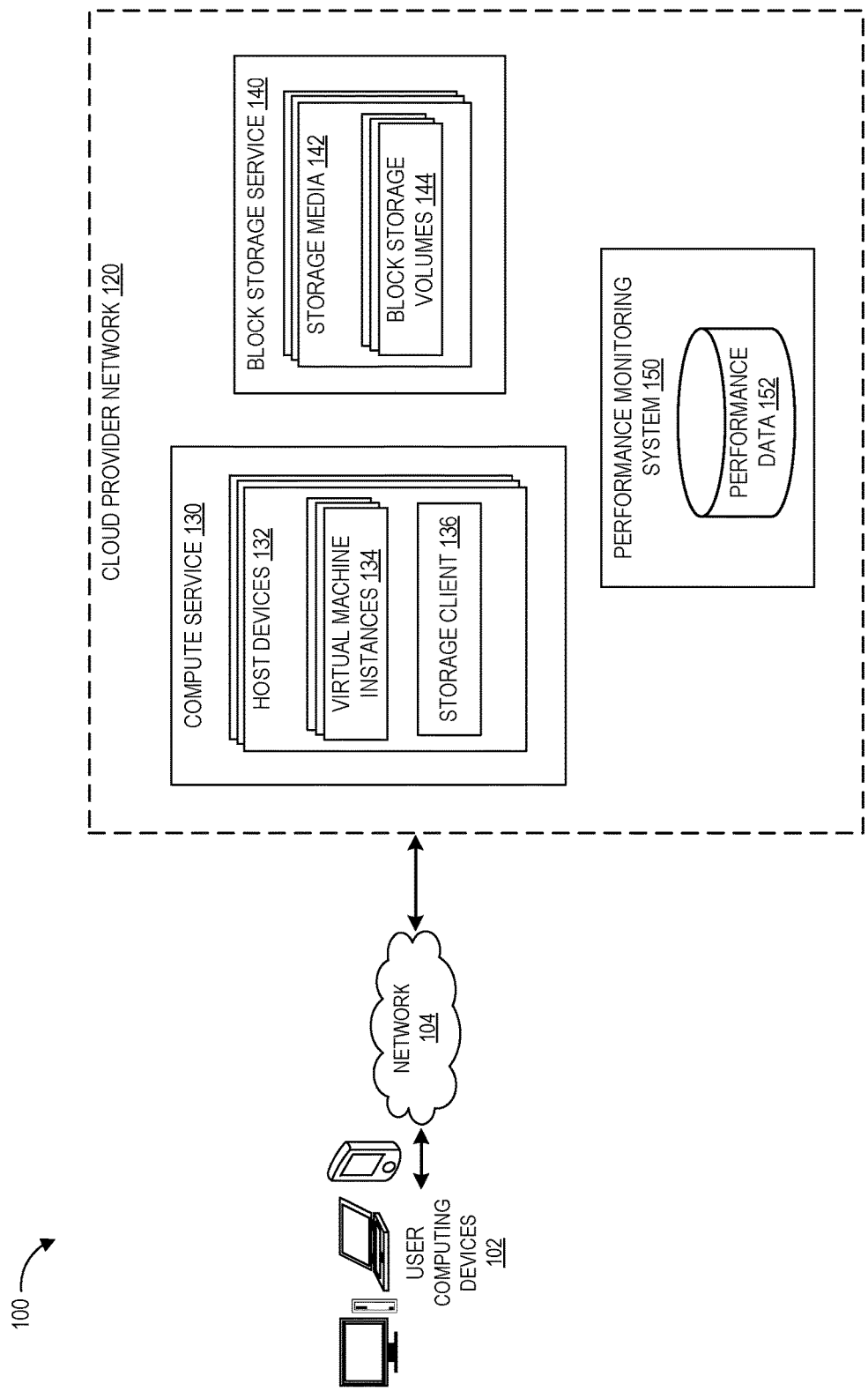
FIG. 1 depicts a schematic diagram of a cloud provider network in which various embodiments according to the present disclosure can be implemented to provide for consistent performance of block storage volumes to virtual machine instances, even as hardware providing such volumes changes.

Generally described, aspects of the present disclosure relate to providing consistent performance of block-storage volumes in cloud computing environments. A block storage volume may act as a virtualized storage drive for a virtual machine (VM) instance, enabling that VM instance to read from and write to the volume as if the volume were physically coupled to the instance. However, particularly in the context of cloud computing, the block storage volume may not be physically coupled to the instance, or even to the host computing device physically hosting the instance. Instead, the block storage volume may be connected to the VM instance via a network, with which another device (e.g., software executing on the host computing device) facilitates interaction such that the VM instance can treat the block storage volume as local. Moreover, rather than being a physical disk, the block storage volume may be a logical volume implemented on one or more underlying physical disk drives, which drives may vary among block storage volumes or even the same storage volume. A provider may not expose these configuration details to the VM instance, to prevent the instance from requiring reconfiguration as, for example, the instance or block storage volume is migrated among host devices in the provider's environment. Nevertheless, these configuration details may alter the performance of the block storage volume with respect to the virtual machine. For example, performance of a block storage volume may vary based on the network distance between the volume and an instance (e.g., with request latency increasing as network distance increases). As another example, performance of a block storage volume may increase when hosted on one type of physical drive relative to when hosted on another type of physical drive, when hosted on a device running one version of software relative to another version of software, or the like. This inconsistent performance leads to inconsistent user experiences, and is generally detrimental to the goal of enabling users to disregard the specific hardware used to provide cloud computing services.

Embodiments of the present disclosure address these problems by enabling consistent performance of block-storage volumes in cloud computing environments, reducing or eliminating variances in such performance due, for example, to network distance or differing physical hardware. More specifically, embodiments of the present disclosure enable application of a performance profile for a block storage volume, establishing desired performance metrics for a block storage volume. In one embodiment, a performance profile is established as a desired performance for a given subset of physical devices in a cloud provider network (e.g., a particular type or configuration of devices, devices in a particular location, etc.). Devices within a cloud provider environment may then be configured to monitor performance of a block storage volume relative to this performance profile, such as by evaluating whether performance of a historical requests to a block storage volume differ from the desired performance and, if so, shaping subsequent performance to the desired performance in the profile. While shaping subsequent performance to a profile may reduce the performance of individual requests, such reduction may only be implemented where a request otherwise exceeds the performance profile. Thus, performance of a block storage volume may be maintained at the level of the profile, which profiles may be explicitly provided to end users. Thus, the techniques herein would not be expected to degrade performance beyond that expected by end users. Moreover, the techniques herein can beneficially ensure consistent performance among block storage volumes. This consistent performance can be beneficial to end users, as an end user might otherwise detect inconsistent performance and attempt to debug or identify the source of the inconsistent performance, despite potentially not having the necessary information to do so (e.g., information as to the physical configuration or layout of a provider environment). Moreover, consistent performance can ensure that different users associated with a profile are provided the performance of that profile, ensuring fairness in the services provided between customers. Thus, by shaping block storage performance to a desired performance indicated within a profile, embodiments of the present disclosure can provide a consistent and desirable end user experience.

In one embodiment, performance profiles may be created by a cloud computing provider independent of underlying hardware, with each profile for example corresponding to a class of performance that might be desired by an end user. For example, the provider may generate "ultra-fast," "fast," "moderate," and "archival" profiles, each associated with different performance characteristics.

In other embodiments, performance profiles may be created by a cloud computing provider based on target performance of particular types of hardware. A variety of different types of hardware providing block-based storage are known in the art, including for example magnetic spinning disk drives and solid state memories. Each category further includes myriad configurations. For example, spinning disk drives may be associated with different spin speeds (rotations per minute, or RPM), different amounts of solid state caches, or different communication protocols (e.g., serial ATA or "SATA", Small Computer System Interface or "SCSI", etc.). Solid state memories may be associated with a variety of physical configurations, configuration types (e.g., NAND flash, NOR flash, NVRAM such as 3D XPoint™, etc.), supported operations, protocols, and interface type (e.g., Peripheral Component Interconnect ("PCI") Express, SATA, etc.). Each configuration of hardware may be associated with a particular target performance, which may be measured for example as a target latency of input/output (I/O) operations to the device. For example, spinning disks may generally be associated with higher latencies for I/O operations relative to solid state storage, and therefore, spinning disks may have a greater target latency than solid state storage. Accordingly, a cloud computing provider may generate performance profiles that approximate a particular type of storage (e.g., a generic storage type, such as "5400 RPM magnetic disk," "7200 RPM magnetic disk," "consumer-grade solid state drive," etc.). End users may then be enabled to implement a block storage volume associated with such a profile, enabling the user to gain the desired performance without concern to whether the underlying physical matches the hardware of the profile.

In some instances, profiles for a particular hardware configuration may be generated empirically. For example, where a cloud computing provider implements a fleet of n class of storage hardware, the provider may monitor I/O requests at each class of hardware to determine a target performance of that hardware class (e.g., average levels or a minimum expected performance that each fully functioning device within the hardware class is expected to meet). The provider may then generate a performance profile based on that target performance and associated with the hardware class. Use of such profiles may enable consistent performance (and thus consistent end user experience) even if those hardware classes are later changed or unavailable. For example, in an instance where an end user has developed a software service using a given class of hardware, but that class of hardware is no longer available (e.g., due to use by other users, deprecation, etc.), the cloud computing provider may provide the end user with access to a block storage volume implementing a performance profile of the class of hardware, thus providing the user with consistent performance despite changes in underlying hardware. Moreover, the embodiments described herein can further enable a cloud provider to differentiate performance without being required to differentiate hardware used to provide services. For example, a cloud provider may elect to replace outdated hardware, such as spinning disk drives, with different and potentially faster hardware (e.g., solid state drives), but continue to enable end users to create "spinning disk" virtual devices by applying an appropriate performance profile to a virtual device implemented on the faster hardware.

The performance profiles as described herein may illustratively store target latencies for I/O requests over time. Moreover, performance profiles may further delineate target latencies accounting for (but not limited to) various characteristics or parameters of I/O requests, such as the command used, the size of a I/O request, current queue depth, among other factors and/or combinations thereof. For example, a performance profile may indicate that a target latency is n milliseconds (ms) for writes command of a given size, a given queue depth, etc.

In one embodiment, performance profiles are implemented by delaying I/O operations for a period of time sufficient to bring measured historical latency in-line with the target latency indicated in a performance profile. For example, a host device may implement a requested I/O operation to a block storage device, but delay a result of that operation to the requesting device (e.g., the VM instance).

Implementing delays in this manner may thus enable the cloud computing environment to account for the time otherwise needed to satisfy the I/O request (e.g., the time needed for the hardware to read or write the requested blocks). In one embodiment, delays are implemented at a host computing device that is hosting the requested device. In this manner, delays resulting from, for example, network communications to the block storage volume may also be accounted for.

In one embodiment, the delay added to an I/O request is calculated according to a proportional, integral, and derivative (PID) control algorithm. Generally described, a PID algorithm tracks an error rate of a process, as calculated by a difference or deviation between measured values of the process and desired target values (e.g., as setpoints), and then adjusts a control to modify subsequent measured values and minimize the error rate. The adjustment to the control can be calculated as a weighted combination of three factors: a proportional factor, an integral factor, and a derivative factor. The proportional factor is calculated to determine a current difference (error) between an observed value and a target value. The integral factor is calculated to determine a duration and magnitude of the error, or in other words, whether the size of the error has changed over time. The derivative factor is used to calculate a rate of change of the error over time. By combining these factors according to a weighted combination (with each factor weighted according to a corresponding coefficient, also referred to as a gain), a control can be tuned such that subsequent error is minimized. For example, a PID controller (implementing a PID algorithm) may be used to control a heater for an area, adjusting output of the heater such that the area reaches and stays at a desired temperature.

More specifically, a proportional factor may be calculated by (i) finding the difference (error) between a target value and the observed value, and (ii) then multiplying that error by a proportional coefficient. Because the result is directly proportional to a magnitude of the error, it is referred to as a "proportional" factor. An integral factor may be calculated by (i) integrating a magnitude of the error with respect to time, and (ii) multiplying the result by an integral coefficient. Because the result is proportional to a magnitude and duration of the error, it is referred to as a "integral" factor. A derivative factor may be calculated by (i) calculating a change in magnitude of the error with respect to time (as a derivative of the error with respect to time), and (ii) multiplying the result by a derivative coefficient. Because the result is proportional to a change in magnitude of the error over time, it is referred to as a "derivative" factor. These three factors can then be combined to control an output of a process (such as a strength of a heater in the example mentioned above). A PID process can be tuned by adjusting the respective coefficients, which control the relative strengths of each factor on the PID output.

In the context of the present disclosure, a PID algorithm (or variation on such an algorithm) can be used to shape performance of network block storage volumes such that the block storage volume achieves a desired performance (e.g., in terms of latency). For example, a host device may submit I/O operations of a client device (e.g., a virtual machine) to a block storage volume and return a result to the client device. The host device may then calculate an observed latency of the client device, and compare the observed latency to a target latency, as specified in a performance profile for the block storage volume, to calculate an "error" reflecting a difference between the observed latency and target latency. The host may apply a PID algorithm to the error to calculate additional latency to be synthetically added to subsequent I/O operations by the host and may delay returning a result of a subsequent I/O operation to the client device in accordance with the calculated synthetic latency. Therefore, a device may utilize a target latency obtained from a performance profile and utilize the proportional, integral, and derivative factors to determine if, and how long, to delay completion of an I/O operation, such that the observed latency matches the target latency with minimal error. For example, if the observed latency is lower than the target latency, the PID algorithm may be used to increase an amount of synthetic latency added relative to past iterations. Conversely, if the observed latency is higher than the target latency, the PID algorithm may reduce the amount of synthetic latency added relative to past iterations (or add no synthetic latency). The target latency may be selected to be higher than the average actual latency of I/O operations prior to the addition of synthetic latency, such that the amount of synthetic latency added is expected to generally be a positive value. In this manner, the host may shape the performance of the volume to the performance indicated in the performance profile.

In one embodiment, the PID coefficients are tuned such that the observed latency reaches the target latency while minimizing response time (the time to reach the target or within a specified distance of the target), settling time (the time to settle within a distance of the target), overshoot (the amount that the observed latency exceeds the target latency), and steady state error (the amount of error observed after the settling time). However, in some instances it may be desirable to tune one or more PID coefficients to maintain steady state error, rather than minimize it. As an example, consider an instance in which actual latency of I/O operations (before the addition of synthetic latency) is relatively close to target latency, such as where a performance profile of a volume attempts to mimic performance of a high-performance physical storage device. Because actual latency can vary (e.g., due to network conditions), significant steady state error (variance in latency) may necessarily exist within a system, regardless of PID tuning. Conversely, where actual latency of I/O operations is relatively far from target latency-such as where a performance profile attempts to mimic performance of a lower-performance physical storage device—the steady state error (variance in latency) in the system may be minimized. This result may be the opposite of what is expected, insomuch as lower-performance physical storage devices may typically be expected to have higher variance in latencies than high performance devices. Accordingly, it may be desirable in some embodiments to tune one or more PID coefficients to induce, rather than minimize, steady state error. For example, in one embodiment the derivative coefficient of performance profile representing a lower performance block storage device is tuned to induce steady state error into observed latency of I/O operations, thus better mimicking operation of such lower performance block storage devices.

While embodiments are described herein with reference to a PID algorithm or process, some embodiments may utilize less than all PID factors. For example, an embodiment may utilize only proportional and integral factors, excluding a derivative factor. In such an embodiment, the calculated proportional and integral factors may be added together create an output. If the derivative factor is used, the proportional, integral, and derivative factors may be added together to form the output. This output may be added to an actual latency to determine target completion time, or, in other words, when the I/O request should finish.

As will be appreciated by one of skill in the art in light of the present disclosure, the embodiments disclosed herein improve the ability of computing systems, such as cloud computing systems providing block storage volumes, to implement such volumes in a consistent manner independently of the underlying hardware used to provide such volumes. Moreover, the presently disclosed embodiments address technical problems inherent within computing systems; specifically, the inherent variations in performance across physical devices and physical configurations. These technical problems are addressed by the various technical solutions described herein, including the application of performance profiles to modify I/O to block storage volumes such that it matches a desired performance profile regardless of underlying physical hardware or configurations. Thus, the present disclosure represents an improvement on computing systems providing block storage volumes and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented. The cloud provider network 120 can be accessed by user computing devices 102 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes a compute service 130, block storage service 140, and performance monitoring system 150 that are in networked communication with one another and with the network 104 to provide users with on-demand access to computing resources including virtual machine instances 134 and block storage volumes 144, among others. These particular resources are described in further detail below. Some implementations of cloud provider network 120 can additionally include domain name services ("DNS") services, object storage services, relational database services, and other service configurations (not illustrated) for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces (GUIs), command line interfaces (CLIs), application programming interfaces (APIs)) enabling end users, via user computing devices 102, to access and configure resources provided by the various services.

The cloud provider network 120 can provide on-demand, scalable computing platforms to users through the network 104, for example allowing users to have at their disposal scalable "virtual computing devices" via their use of the compute service 130 and block storage service 140. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

Turning specifically to the roles of the different services within the cloud provider network 120, the compute service 130 include one or more host devices 132 on which provide resizable computing capacity to users for building and hosting their software systems. The host devices 132 and associated control plane functionality can provide an elastic compute cloud service of the cloud provider network. Compute services can be referred to as a virtual compute service, or cloud compute service, in various implementations. Users can use the host devices 132 to launch as many virtual machine instances 134 referred to as virtual computing environments, virtual compute instances, virtual machines, or "instances," as they need. While FIG. 1 depicts host devices 132 as including VM instances 134, in some instances the compute service 130 may enable an end user to directly access a host device 132 as a "bare metal" compute instance, providing access to the device 132 without virtualization.

Instances 134 can have various configurations of processing power, memory, storage, and networking capacity depending upon user needs. The host devices 132 can also include computer storage for temporary data used while an instance is running, however this storage may be limited. For example, the storage may be ephemeral, meaning that data stored in the storage is lost as soon as the instance is shut down this data is lost. To provide access to additional storage, each host device 132 can illustratively include a storage client 136 that enables access to the block storage service 140. As discussed below, the block storage service 140 can operate to provide virtualized disk drives to instances 134 in the form of block storage volumes 144. The storage client 136 may enable instances 134 to interact with such volumes 144, such as by accepting I/O requests from instances 134 according to a local mass storage protocol (e.g., SATA, SCSI, etc.) and converting such I/O requests to network communications with the block storage service 140. The storage client 136 may further handle other aspects of use of a block storage volume 144, such as authenticating the to block storage service 140, initializing a connection to the volume 144, and the like. The process of a client 136 initializing a connection to a volume 144 and making the volume available to an instance 134 may be referred to as "attachment," as the volume 144 can after such process become available to the instance 134 in a manner similar to physically attaching a disk drive to a computing device.

In one embodiment, the storage client 136 is implemented as software executing on host devices 132, such as code executed within a hypervisor operating system that hosts the virtual machine instances 134. In another embodiment, the storage client 136 is implemented within an isolated hardware environment, such as an "offload" card physically present within host devices 132 that presents to the host devices 132 as one or more storage devices. Such an offload card of the host devices 132 can include one or more CPUs that are not available to instances 134, but rather are dedicated to instance management tasks such as virtual machine management, input/output virtualization to network-attached storage volumes, local migration management tasks, instance health monitoring, and the like. Use of a hardware offload card may, for example, enable greater use of a main processor of a host device 132 by instances 134, ensure further security to communications between the instances 134 and the volumes 144, and enable use of block storage volumes 144 as virtualized disk drives for "bare metal" instances implemented on host devices 132 without virtualization.

As noted above, the block storage service 140 can provide persistent data storage for the instances 134 in the form of block storage volumes 144, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." Data of volumes 144 may be stored in the form of blocks on storage media 142, which may include any number of known non-volatile storage media, including magnetic disk drives, solid state memories, and the like. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 KB, 8 kB, 16 KB, 32 kB, 64 KB, 128 KB, 256 kB, 512 KB, or larger, depending upon the implementation. In accordance with embodiments of the present disclosure, the specific hardware of storage media 142 can be heterogenous, encompassing media of different types, manufacturers, revisions, production runs, and the like, and a consistent performance for a volume 144 can be achieved by associating the volume 144 with a performance profile. Each volume 144 is illustratively hosted by one or more storage media 142 that are associated with performance meeting or exceeding the performance profile of the volume 144.

User volumes 106, which can be treated as an individual drive ranging for example from 1 GB to 1 terabyte TB (or more) in size, are made of one or more blocks stored on the block storage service 140. Although treated as an individual drive, it will be appreciated that a volume 144 may be stored as one or more virtualized devices implemented on one or more underlying storage media 142. Volumes 144 may be partitioned a small number of times (e.g., up to 16) with each partition stored on a distinct physical device of the cloud provider network 120 that has the ability to transfer data at around 1 GB per second ("Gbps") in some implementations. These volumes provided persistent, dedicated storage that can be attached to particular instances 134 of the compute service 130. Each volume 144 may be "attached" to an instance 134 running on a compute service 130, and can be detached from that instance 134 and re-attached to another. As noted above, attachment between a volume and an instance can refer to the establishment of a connection between a storage client 136 associated with the instance 134 and the volume 144. This connection may be referred to as a "lease" in some implementations, and can enable to instance 134 to view the volume 144 as if it were a local storage drive, even though the volume 144 and instance 134 may be hosted on different physical machines and communicating over a network. The block store servers 105 may have built-in redundancy for volumes by replicating the volume across multiple storage media 142, such as different media 142 within an availability zone, which means that volumes will not fail if an individual drive fails or some other single failure occurs.

While not shown in FIG. 1, the block storage service 140 may include one or more servers to facilitate interaction between storage clients 136 and storage media 142. One examples configuration of a block storage service 140 is shown, for example, in U.S. patent application Ser. No. 16/579,626, entitled "CROSS-ZONE REPLICATED BLOCK STORAGE DEVICES" and filed Sep. 23, 2019, the entirety of which is incorporated by reference herein. Moreover, while shown in FIG. 1 as distinct, the compute service 130 and block storage service 140 may in some instances be implemented utilizing a single set of computing devices. For example, a single set of servers may be used to implement both the compute service 130 and block storage service 140.

As noted above, the performance of volumes 144 from the point of view of instances 134 may vary according to various configurations of the network 120, including for example according to network distances between clients 136 and volumes 144 or according to the specific media 142 on which a volume 144 is stored. Thus, to provide consistent performance, each storage client 136 can be configured to apply a performance profile to I/O requests (including, for example, reads from and writes to the volume 144, among other potential storage commands defined by a particular mass storage protocol implemented by an instance 134, a variety of which are known in the art). More specifically, each storage client 136 may be configured to monitor latencies of I/O requests, and to selectively delay such requests in accordance with the performance profile to shape the performance of such requests in accordance with a target performance, such as a target latency, specified in the performance profile. Performance profiles may illustratively be stored by a performance monitoring system 150 within performance data 152. As discussed above, each performance profile may indicate, for example, a target latency, which may be used by storage clients 136 to selectively delay I/O requests by use of a PID algorithm. A performance profile may further indicate parameters of the PID algorithm, such as coefficients for individual factors to be used when calculating an output. As discussed in more detail below, a storage client 136 may thus apply a PID algorithm to I/O requests of virtual machine instances 134 to shape such I/O requests in accordance with the performance profile of the volume. While shown as a distinct element of the network 120, the system 150 may in some instances be implemented using, for example, the compute service 130 and block storage service 140.

Figure 2:
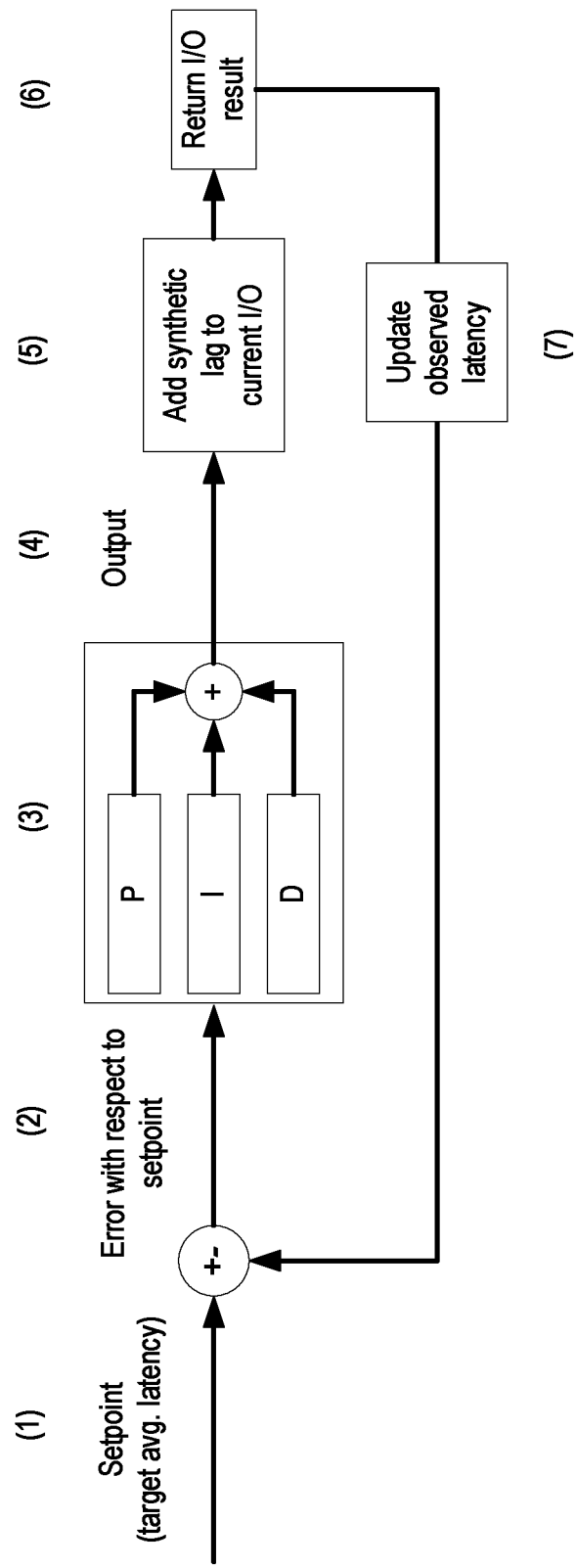
FIG. 2 depicts an illustrative visualization of a proportional derivative integral (PID) process used to manage performance of a block storage volume acting as a virtualized storage drive to a virtual machine instance on the cloud provider network of FIG. 1, which may be used to provide consistent performance when accessing the block storage volume.

To further illustrate the concept of performance profiles, FIG. 2 provides an illustrative visualization of a proportional derivative integral (PID) process that may be used to manage performance of a block storage volume 144 acting as a virtualized storage drive to a virtual machine instance 134 on the cloud provider network 120 of FIG. 1, which may be used to provide consistent performance when accessing the block storage volume 144. As shown in FIG. 2, the PID process is iterative, such that an observed value (the observed latency) is expected to reach a setpoint (the target latency) over a number of iterations. The process of FIG. 2 may be implemented, for example, by the storage client 136 of FIG. 1. Each iteration of the process illustratively corresponds to an I/O operation on a block storage volume 144.

The PID process begins at (1), where the storage client 136 obtains a setpoint value indicated within a performance profile for the block storage volume 144. In FIG. 2, the setpoint value is illustratively a target latency of the block storage volume. As stated above, a single block storage volume 144 may have multiple performance profiles to account for various characteristics of I/O requests, such as the command used, the size of a I/O request, current queue depth, among other factors and/or combinations thereof. For example, a first performance profile may indicate that a target latency is n1 ms for write command of a given size, a given queue depth, and a range of I/O requests. As another example, a second performance profile may indicate that a target latency is n2 ms for read command of a given size, a given queue depth, and a range of I/O requests. The PID process illustrated in FIG. 2 may be implemented in parallel for each such set of requests, and the setpoint retrieved at (1) may correspond to a particular PID process being implemented (e.g., the process for a particular type of I/O request).

At (2), the storage client 136 calculates one or more current error values with respect to the setpoint value. For example, the client 136 may calculate an error with respect to observed latency, reflecting the difference of the target latency value and observed latency of a prior I/O request of the block storage volume 144, as measured based on historical I/O latency after modification via the PID process (e.g., from the point of view of a VM 134, as discussed below). The observed latency illustratively represents the latency of the prior I/O request after addition of synthetic lag via a prior iteration of the PID process (or via an initialization value). Accordingly, the error with respect to observed latency indicates how far away the performance of the prior I/O request was from the target value. In addition to the error with respect to observed latency, the client 136 can in some instances calculate an error with respect to actual latency for a current I/O request. For example, the PID process may be implemented subsequent to obtaining a response to an I/O request from the block storage volume 144, with the actual latency reflecting a difference in time between reception of the I/O request and subsequent response at the client 136 (e.g., as a round trip time to communicate with the block storage system 144 over the network). As discussed below, these error values can be used during to calculate PID factors controlling synthetic latency added to the current I/O request.

At (3), the storage client 136 calculates the PID factors using the calculated error. The proportional factor ("P") illustratively represents a value that is proportional to the magnitude of an error. For example, the proportional factor may be calculated as $K_p e(t)$, where $K_p$ is a proportional coefficient (e.g., defined within the performance profile) and e(t) is a given error as calculated at (2). The integral factor ("I") illustratively represents an integration of the magnitude of an error with respect to time. For example, the integral factor may be calculated as $K_i \int_{t-n}^{t} e(\tau)d\tau$, where $K_i$ is an integral coefficient (e.g., defined within the performance profile), e(t) is a given error at time t, t is the variable of integration, and n is a configurable number of past iterations. The derivative factor ("D") illustratively represents a derivative of the magnitude of an error with respect to time. For example, the derivative factor may be calculated as $K_d$ de (t)/dt, where $K_d$ is a derivative coefficient (e.g., defined within the performance profile), and e(t) is a given error at time t. In one embodiment, the derivative is calculated as the derivative coefficient multiplied by the change in error rate between two prior I/O operations (e.g., two immediately preceding I/O operations).

In one embodiment, an output of the PID algorithm is used to directly determine synthetic latency. For example, the amount of synthetic latency added to a current I/O operation may be equal to the output of the PID algorithm. In this embodiment, it can be important to ensure that the steady-state output of the PID algorithm is non-zero, such that if the algorithm reaches a steady-state error with respect to observed latency of zero (e.g., observed latency is equal to the setpoint) the output of the PID algorithm is non-zero. Otherwise, a zero-output of the PID algorithm would result in zero synthetic latency, increasing the error with respect to observed latency (under the assumption that actual latency is less than the setpoint). This can result in undesirable instability in synthetic latency values. To account for this issue, when synthetic latency added is determined directly from output of the PID algorithm, one or more of the PID factors may be calculated based on the error with respect to actual latency (the difference between the setpoint and the actual latency required to obtain a result for a current I/O operation, before addition of synthetic latency). For example, the proportional (P) factor may be calculated with respect to the error with respect to actual latency (e.g., as $K_p e(t)$, where e(t) is the actual latency of a current I/O operation). Other factors, such as the I and D factors, may be calculated with another error value, such as the error with respect to observed latency. By calculating one or more PID factors using an error with respect to actual latency, the output of the PID algorithm can be expected to be non-zero even when the error with respect to observed latency of zero, so long as the error with respect to actual latency is non-zero.

In another embodiment, the output of the PID algorithm does not directly determine synthetic latency, but instead determines a change in synthetic latency relative to a past iteration of the PID process. For example, the client 136 can maintain a synthetic latency value across iterations, modifying the synthetic latency value by the output of each PID iteration (e.g., adding or subtracting from the prior synthetic latency value by an output of the PID algorithm to result in a current synthetic latency value). In this example, the above-noted problem is avoided, as a zero value for the error with respect to observed latency would result in a non-changing but potentially non-zero synthetic latency value, thus enabling the error with respect to observed latency to also maintain a steady state (though subject to variances in actual latency, which is expected to be non-steady state under many operating conditions).

As noted above, in some embodiments less than all PID factors are used. Moreover, the various coefficients may be tuned to optimize certain parameters. For example, the coefficients may be tuned to minimize response time, settling time, and overshoot. In some embodiments, the coefficients vary according to the performance profile. For example, some performance profiles may include coefficients tuned to induce rather than minimize steady state error, such as to mimic performance of a physical device associated with the performance profile.

At (4), the storage client 136 combines the PID factor values to determine an output corresponding to synthetic latency to be added to a current I/O request. In accordance with the PID process, the combination of PID factors is calculated such that the addition of synthetic latency to the present I/O request moves the observed latency of the I/O request towards the target latency.

At (5), the storage client 136 delays the present I/O request according to the output. For example, where the PID algorithm is implemented subsequent to processing the I/O request and receiving a response, the storage client 136 may determine a completion time of the current I/O request by incrementing an initial time (e.g., the current time or an actual time of receiving a response to the I/O request) by the output. Where the PID algorithm is implemented prior to processing the I/O request, the storage client 136 may delay submitting the I/O request to the block storage service 140 by the output of the PID calculate. Thereafter, at (6), storage client 136 returns the I/O result to a requesting device (e.g., a VM instance 134). Therefore, the observed latency of the I/O request, including both the delay and the actual time required to service the I/O request at the block storage service 140, can be shaped to match the target performance indicated within a device profile.

Lastly, at (7), the storage client 136 updates the observed latency value for subsequent iterations. As noted above, the observed latency illustratively represents a total latency of an I/O request from a point of view of a requesting device (such as a VM instance 144)—that is, a total time between submission of the I/O request and returning of a result to the requesting device. The observed latency thus includes both synthetic latency and the actual time required to service the I/O request at the block storage service 140 (including, e.g., network latency between the storage client 136 and the block storage service 140). The PID algorithm can then proceed to a subsequent iteration, as discussed above.

Figure 3:
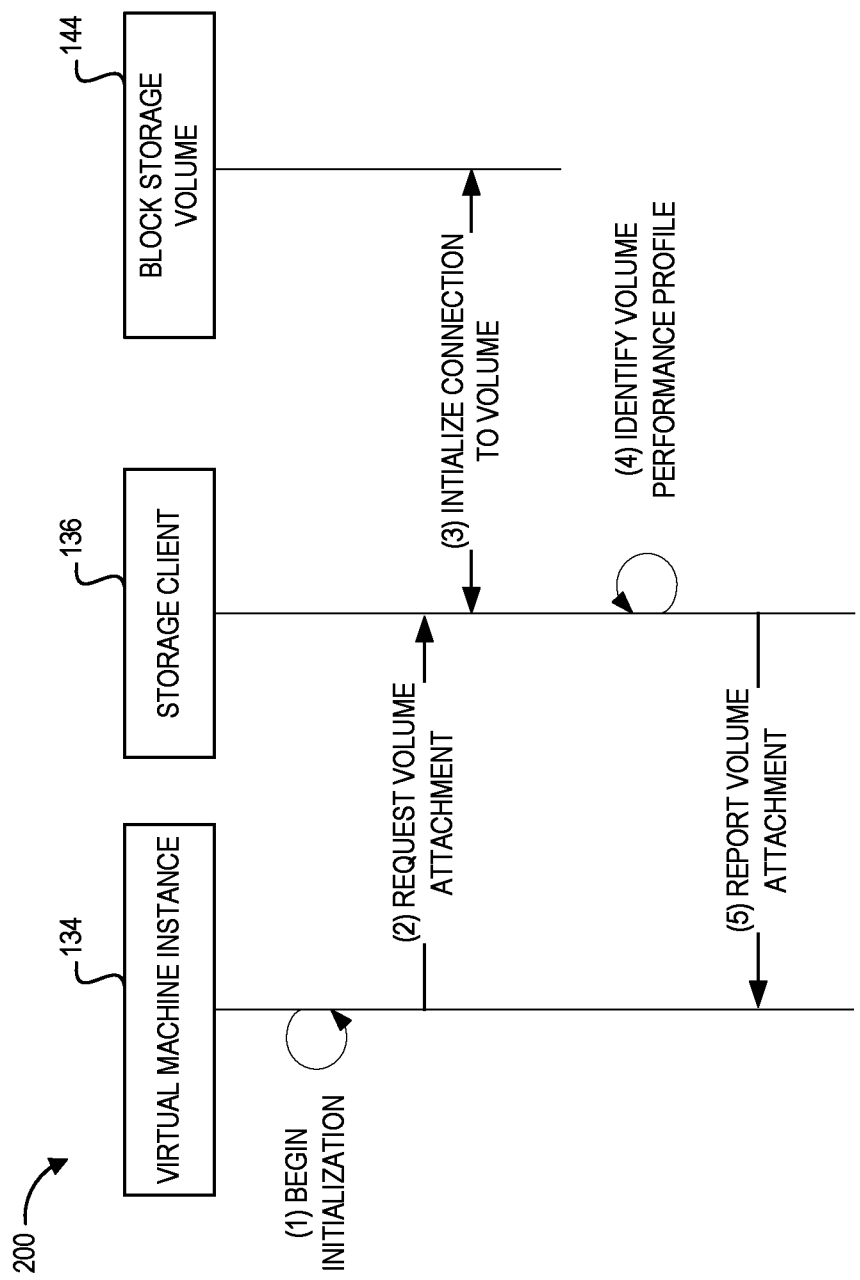
FIG. 3 depicts illustrative interactions on the cloud provider network of FIG. 1 to attach a virtual machine instance to a block storage volume acting as a virtualized storage drive, including loading a performance profile of the block storage volume on a storage client enabling the virtual machine instance to access the block storage volume.

With reference to FIG. 3, illustrative interactions will be described for attaching a block storage volume 144 to a virtual machine instance 134 to facilitate use of the volume 144 as a virtualized storage drive for the instance 134 while providing for consistent performance of the volume 144, in accordance with embodiments of the present disclosure. The interactions of FIG. 3 may occur, for example, after a user has completed creation of the volume 144 on the block storage service 140, including association of the volume 144 with a particular performance profile corresponding to a desired performance of the volume 144.

The interactions begin at (1), where the instance 134 begins initialization. Initialization may refer, for example, to creation of the instance 134 on the compute service 130, such as in response to an end user request to deploy a new instance 134.

To facilitate storage on the instance 134, the instance 134, at (2), transmits a request to the client 136 to attach to the volume 144. The client 136, at (3), in turn initializes a connection to the volume 144. For example, the client 136 may establish a transport control protocol (TCP) network connection to the volume 144, such that subsequent I/O requests of the instance 134 can be passed to the volume 144 via the connection.

In addition, at (4), the client 136 identifies a performance profile associated with the volume 144, which may be identified for example by metadata of the volume 144 stored within the block storage service 140. As noted above, the profile may correspond to desired performance of the volume 144, as established by an end user (e.g., during creation of the volume 144). For example, the profile may store one or more a desired latencies of the volume based on factors such as command used, the size of a I/O request, current queue depth, among other factors and/or combinations thereof. Moreover, the performance profile may include parameters used in shaping I/O of the volume 144, such as PID coefficients, that alter observed performance of the volume. The client 136 then, at (5), reports to instance 134 that it successfully attached to volume 144. Thus, the instance 134 may continue initialization including, for example, booting based on information stored within the volume 144 (e.g., an operating system). During operation, the instance 134 may make I/O requests to the volume 144 via the storage client 136 and, in accordance with embodiments of the present disclosure, the client 136 may selectively delay such I/O requests by use of a PID algorithm, shaping observed performance of the volume 144 (from the perspective of the client 136) to the target performance value or values specified in the performance profile of the volume 144.

Figure 4:
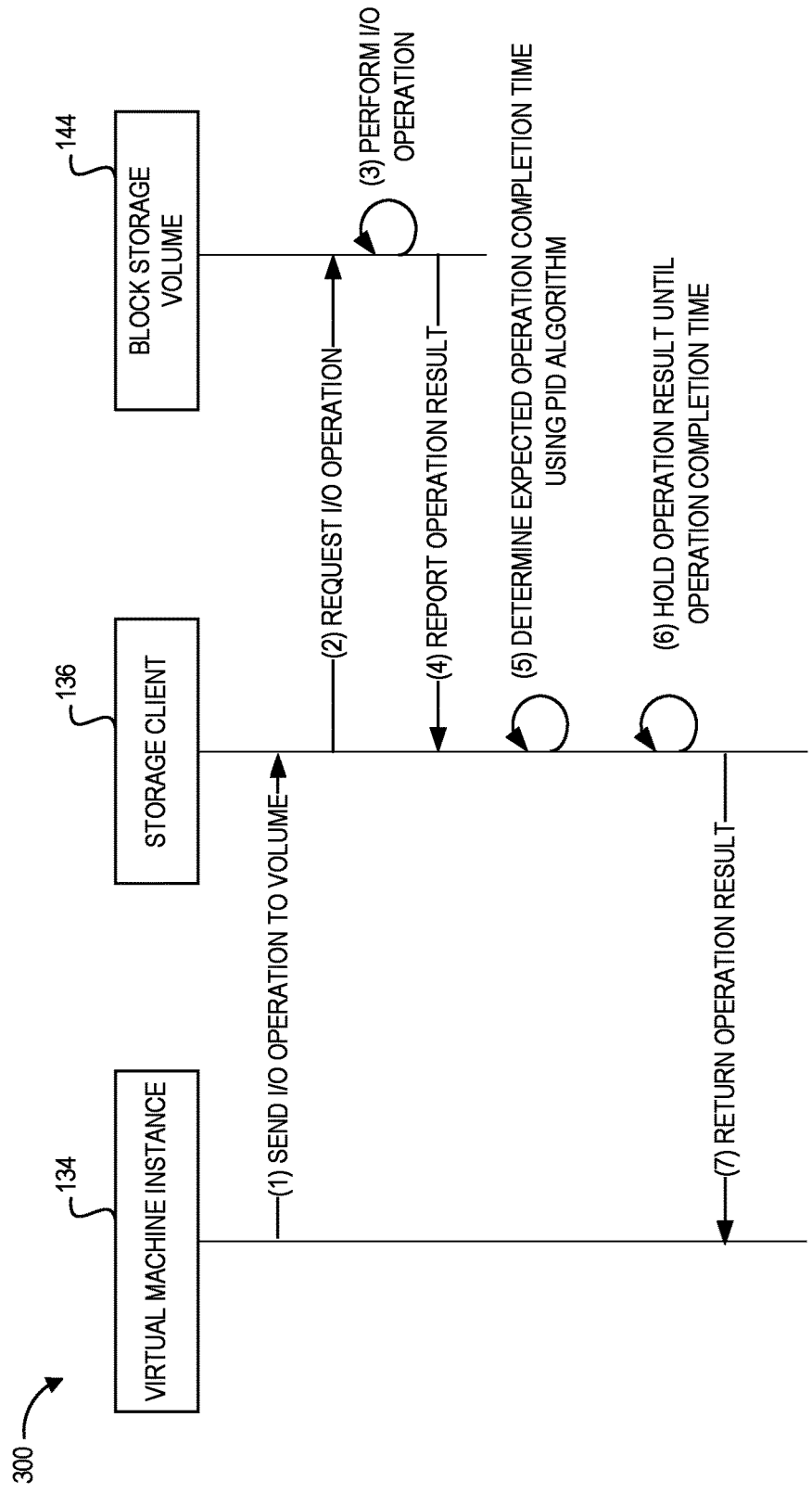
FIG. 4 depicts illustrative interactions on the cloud provider network of FIG. 1 to apply a performance profile of a block storage volume acting as a virtualized storage drive to input/output (I/O) requests of a virtual machine instance, providing a consistent performance when accessing the block storage volume.

Illustratively interactions for shaping performance of a volume 144 on the storage client 136 are shown in FIG. 4. Specifically, FIG. 4 depicts interactions that may occur on handling of an I/O request from the instance 134 to the volume 144 in accordance with embodiments of the present disclosure. The interactions of FIG. 4 may occur, for example, during operation of the instance 134 and subsequent to attachment of the volume 144 to the instance.

The interactions of FIG. 4 begin at (1), where the instance 134 sends to the client 136 an I/O operation. The I/O operation may correspond to any operation supported by a mass storage protocol of the client 136, including for example requests to read from or write data to the volume 144 (among a wide variety of other operations, such as requests to flush a cache of a volume, TRIM commands to mark data as unused, etc.). The client 136, in turn, requests the I/O operation from the volume 144 at (2). For example, the client 136 may encapsulate the request within a TCP packet and transmit the packet to a device of the block storage service 140 hosting the volume 144. Encapsulation may occur securely, such that the client 136 does not itself have access to the content of the request. For example, the client 136 may generate encapsulation data (e.g., a header and footer) that is securely combined with the I/O request via a hardware function of the instance 134, without exposing the content of the I/O request to the client 136.

On receiving the request, the volume 144, at (3), performs the I/O operation. Specific details of performing an I/O operation on a block storage volume are beyond the present disclosure, and are thus not discussed herein. However, in brief, performing the I/O operation may include applying the operation to each relevant partition of the volume 144, propagating the operation to one or more redundant media supporting the volume 144, logging the operation, or the like. On completion of the I/O operation, the volume 144 returns an operation result to the client 136, at (4). The result may include, for example, acknowledgement of one or more blocks to be written or data of one or more blocks that have been read.

At (5), the storage client 136 determines a synthetic latency (if any) to be added to the I/O request by application of a PID algorithm to the I/O request according to the performance profile of the volume 144. For example, the client 136 may use the target latency specified in the performance profile to calculate an error based on an actual and/or observed latency of the current I/O operation. Thereafter, the storage client 136 may be calculate PID factors in order to determine a synthetic latency to add to the request, in order to steer the observed latency of the request (from the point of view of the instance 134) towards the target latency. As discussed above, PID coefficients (e.g., as indicated in a performance profile) may be selected to shape observed latency in accordance with desired performance. For example, PID coefficients may be selected to minimize overshoot, response time, settling time, and/or steady state error. In some instances, PID coefficients may be selected to shape characteristics of overall observed latency. For example, a derivative coefficient may be selected to induce, rather than minimize, steady state error, such that observed latency better matches an expected performance corresponding to a performance profile.

Thereafter, at (6), the client 136 delays the result of the I/O operation according to the synthetic latency. For example, where a target latency is 5 ms, an actual latency is 2 ms, and a prior I/O request had an observed latency of 4 ms, the output may be between 2 to 3 ms which is added to the actual latency (to get the current round trip complete latency between 4 and 5 ms), and thus the storage client 136 may delay the current I/O operation by the output in order to steer an observed latency towards the 5 ms target latency. One skilled in the art will appreciate that the output in this example may be greater than or less than these values, according to the PID algorithm, as that algorithm may be tuned to optimize various parameters (such as response time, settling time, overshoot, or steady state error) rather than simply modifying a request to match a target. Thereafter, at (7), the client 136 returns the operation result to the instance 134. Thus, from the viewpoint of the instance 134, the I/O operation completes in an observed period of time (an observed latency) shaped via the PID algorithm to correspond to the target latency. As noted above. the observed latency of this request may then be used in a subsequent iteration of the PID algorithm to calculate historical error, further shaping subsequent I/O latencies to better match the performance profile.

In some embodiments, the storage client 136 is configured to constrain synthetic latency to outer bounds. For example, the storage client 136 may limit synthetic latency to positive values (as the storage client 136 may be unable to reduce actual latency). As another example, the storage client 136 may limit synthetic latency to an upper bound set as a multiple of target latency (which multiple may be set, for example, in the performance profile), such that observed latency does not exceed that upper bound plus actual latency.

While FIG. 4 depicts a single I/O operation, the interactions of FIG. 4 may occur repeatedly and in some cases concurrently during operation of the instance 134. Because each operation can be selectively delayed according to application of a PID algorithm to past observed performance, the overall performance of the volume 144, from the point of view of the instance 134, can be expected to conform to the profile. Thus, potential variances in performance between volumes 144 (e.g., due to different underlying physical devices or location) can be mitigated, providing end users with a consistent experience across multiple volumes 144 corresponding to a given performance profile.

While FIG. 4 depicts calculation of synthetic latency subsequent to an I/O operation, in some embodiments a storage client 136 calculates synthetic latency prior to or concurrently with processing an I/O operation (e.g., by submitting the I/O operation to the block storage service 140). Moreover, in some embodiments the storage client 136 injects synthetic latency to submission of an I/O operation (by delaying the submission) rather than by delaying the result. Thus, the interactions of FIG. 4 are intended to be illustrative in nature.

Figure 5:
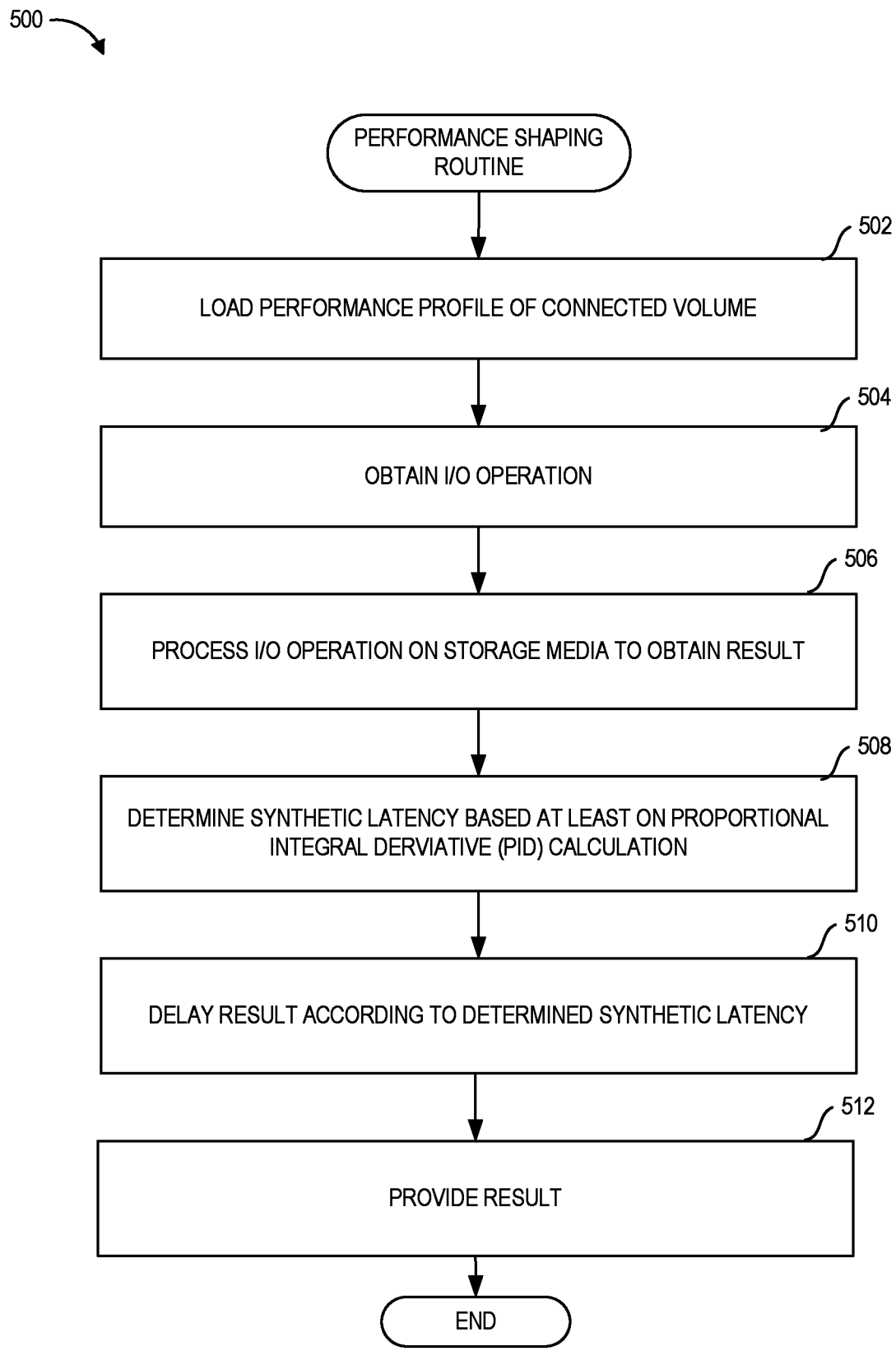
FIG. 5 depicts an illustrative routine implemented on the cloud provider network of FIG. 1 to provide a consistent performance when accessing the block storage volume acting as a virtualized storage drive.

With reference to FIG. 5, an illustrative routine 500 will be described for providing consistent performance when accessing the block storage volume. The routine 500 may be implemented, for example, by a storage client 136 of FIG. 1.

The routine 500 begins at block 502, where the client 136 obtains a performance profile of a connected volume 144 (e.g., a volume 144 with which the client 136 enables another device, such as a VM instance, to interact). As noted above, the profile may be associated with the volume 144 on creation of that volume 144, and identified, for example, in metadata for the volume 144. The profile may contain one or more target latencies for the volume, which may be differentiated for example by command used, the size of a I/O request, current queue depth, among other factors and/or combinations thereof. Moreover, the profile may include one or more PID coefficients used by the storage client 136 to implement PID control of I/O for the volume 144. Alternatively, the storage client 136 may be preconfigured with PID coefficients.

At block 504, the client 136 obtains an I/O operation from a requesting device, such as a VM instance. As noted above, the I/O operation may correspond to any operation supported by a mass storage protocol of the client 136, including for example requests to read from or write data to the volume 144.

At block 506, the client 136 causes the operation to be performed on the volume 144, such as by transmitting the operation to one or more physical devices hosting the volume 144 and performing the operation on underlying storage media for the volume 144. The client 136 further obtains a result of the operation, such as acknowledgement of one or more blocks to be written or data of one or more blocks that have been read.

At block 508, the client 136 uses a PID calculation to determine an amount of synthetic latency to be added to the operation prior to returning a result of the operation to a requesting device. For example, the storage client 136 may calculate an error with respect to actual latency reflecting a difference between a target latency for the I/O operation and an actual latency of the current I/O operation (e.g., how long it actually takes this current I/O request to be completed at volume 144 and a result of the I/O to be returned to the client 136). Additionally, the storage client 136 may calculate an error with respect to observed latency reflecting a difference between a target latency for the I/O operation and an observed latency of a prior I/O operation (e.g., a prior I/O operation with the same target latency). The storage client 136 may then apply a PID algorithm to the errors to determine an output representing synthetic delay. As noted above, the PID algorithm can thus enable observed latency for the I/O operation to be adjusted to compensate for trends associated with latency used to shape performance of an I/O request. While the routine 500 describes a PID calculation, in some embodiments less than all PID factors may be used. For example, a calculation may include only a proportional (P) and integral (I) factor, and thus lack a derivative (D) factor. Moreover, as noted above the coefficients of each factor may be tuned to shape characteristics of outputs of the PID calculation. For example, one or more coefficients-such as the derivative coefficient—may be turned to introduce, rather than avoid, steady-state error, thus enabling the storage client 136 to more accurately mimic certain types of physical drive that may also handle I/O with significant variance in latency.

At block 510, the client 136 delays providing the result to the requesting device according to the determined synthetic latency. For example, the client 136 may implement a "wait" function until t+17 ms, where t indicates the time of obtaining the I/O operation at block 504 and 17 ms is the synthetic latency as output by the PID calculation. Subsequent to a period corresponding to the synthetic latency elapsing, at block 512, the client 136 provides the result to the requesting device, thus ensuring performance of the volume 144 in accordance with the profile. The routine 500 may then end.

While described in FIG. 5 as conducted by a storage client 136, in some embodiments the routine 500 may additionally or alternatively be implemented by another device of the cloud provide network 120, such as a device within the block storage service 140 (e.g., a server hosting storage media 142 of the volumes 144). In such a configuration, the performance profile may illustratively be adjusted, for example, to account for expected network latency between that device and the instance 134. Alternatively, the storage client 136 and block storage service 140 may operate in conjunction to implement the routine 500. For example, the block storage service 140 may implement the routine 500 as described while utilizing observed latency values reported by the storage client 136, such that the performance profile need not be adjusted to account for expected network latency. Furthermore, various modifications to the routine 500 are contemplated herein. For example, while the routine 500 depicts withholding a result from a client 136 until the target completion time, in some instances the storage required to hold such I/O operation results may exceed the storage available at the client 136. Accordingly, the routine 500 may illustratively be modified such that a result of the I/O operation is provided to a requesting device, without notifying the requesting device of that result. For example, the client 136 may access a memory space of the requesting device and store a result of the I/O operation within that space. However, the client 136 may withhold notifying the requesting device of that storage until the target completion time. Thus, memory requirements of the client 136 can be significantly reduced. As another example, the ordering of elements within the routine 500 may vary. For example, rather than delaying a result of an I/O operation, the routine 500 may include delaying submission of an I/O operation according to a determined synthetic latency. Thus, the routine 500 is intended to be illustrative.

While the routine 500 enables one mechanism for shaping performance of a volume 144, others are possible and in some instances may be implemented in addition to the routine 500. For example, the client 136 may implement the routine 500 while concurrently acting to throttle traffic to the volume 144, such as to limit I/O operations per second (IOPS) to a threshold range. Thus, the routine 500 may reflect only a portion of operation of a client 136.

Figure 6:
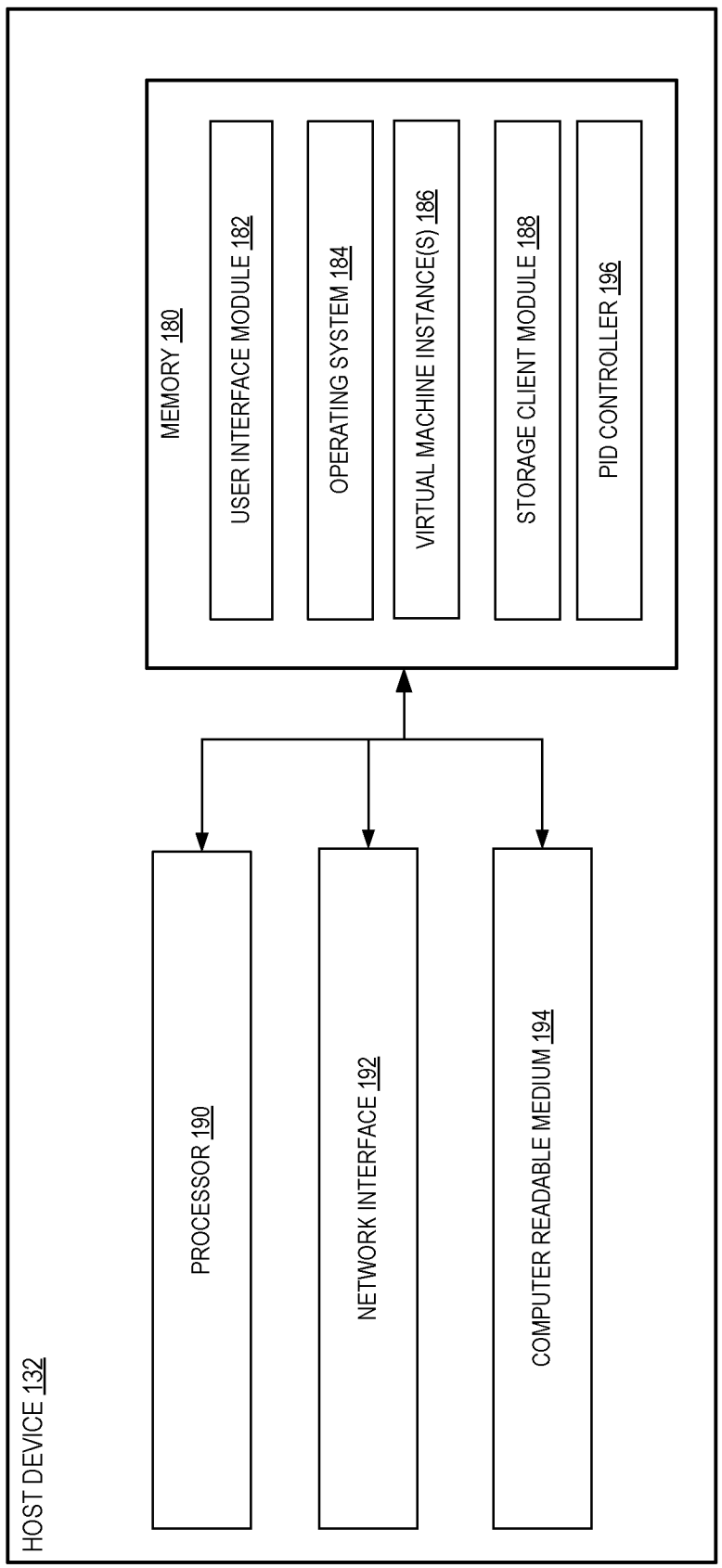
FIG. 6 depicts a general architecture of a computing device or system providing a host device in accordance with aspects of the present disclosure, including a storage client enabling a virtual machine instance on the host device to access the block storage volume acting as a virtualized storage drive and providing consistent performance when accessing the block storage volume.

FIG. 6 depicts an example architecture of a computing system (referred to as a host device 132) that can be used to perform one or more of the techniques described herein or illustrated in FIGS. 1-5. The general architecture of the host device 132 depicted in FIG. 6 includes an arrangement of computer hardware and software modules that may be used to implement one or more aspects of the present disclosure. The host device 132 may include many more (or fewer) elements than those shown in FIG. 6. It is not necessary, however, that all of these elements be shown in order to provide an enabling disclosure. As illustrated, the host device 132 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 (e.g., a hypervisor) that provides computer program instructions for use by the processor 190 in the general administration and operation of the public snapshot service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include virtual machine instances 186, a storage client module 188, and a PID controller 196 that may be executed by the processor 190. In one embodiment, the storage client module 188 and PID controller 196 when executed implement various aspects of the present disclosure. For example, the storage client module 188 may operate to accept I/O commands from virtual machine instances 186, facilitate submission of such commands to a remote system via the network interface 192, accept results of such commands from the remote system, and provide the results to the virtual machine instances 186. In accordance with embodiments of the present disclosure, the storage client module 188 may introduce into this command handling process synthetic latency as calculated using the PID controller 196. The storage client module 188 and PID controller 196 may thus shape of performance of a volume 144 in accordance with a performance profile, and/or other implement aspects discussed herein or illustrated in FIGS. 1-5. While shown as a software module in FIG. 6, the storage client 136 may in some instances be implemented on an offload card included within the host device 132 (e.g., as a PCI-e card with discrete and independent computing resources, such as a processor and memory).

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could." "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for providing consistent performance of block storage volumes in a cloud provider environment, the system comprising:
   a host device hosting a virtual machine instance;
   one or more storage media hosting a block storage volume acting as virtual storage for the virtual machine instance, the one or more storage media in communication with the host device over a network; and
   a storage client implemented on the host device and facilitating submission of input/output (I/O) operations to the block storage volume by the virtual machine instance via a local mass storage protocol, wherein the storage client is configured to:
   obtain a performance profile for the block storage volume, the performance profile indicating a target latency for I/O operations on the block storage volume;
   obtain an I/O operation from the virtual machine instance;
   submit the I/O operation to the one or more storage media, wherein the one or more storage media are configured to process the I/O operation and return to the storage client a result of the I/O operation in a first period of time;
   determine, a synthetic delay for the I/O operation by at least:
      calculating a proportional factor that is proportional to a first error value, the first error value reflecting a difference between the target latency and an actual latency required to obtain a result of the I/O operation, the actual latency corresponding to the first period of time,
      calculating an integral factor that is proportional to a magnitude and duration of past error values for the block storage volume, the past error values reflecting historical deviations of observed latencies for past I/O operations from the target latency, and
      calculating a derivative factor that is proportional to a rate of change of the past error values,
      wherein the synthetic delay is calculated based on a combination of the proportional, integral, and derivative factors;
   delay returning the result to the virtual machine instance until the synthetic delay has elapsed; and
   subsequent to the synthetic delay elapsing, provide the result of the I/O operation to the virtual machine instance.

2. The system of claim 1, wherein the target latency corresponds to an expected performance of a physical drive type, the physical drive type corresponding to one of a magnetic spinning disk drive or a solid state memory drive.

3. The system of claim 2, wherein target latency is calculated to match a minimum expected performance of the physical drive type determined based at least partly on monitored latency of I/O operations of a plurality of drives of the physical drive type.

4. The system of claim 1, wherein the past error values include the first error value, and wherein the rate of change of the past error rate is calculated as a difference between the first error value and an error value for an I/O operation immediately preceding the past I/O operation.

5. A method implemented at a device facilitating interaction between a compute instance and a block storage volume acting as virtual storage for the compute instance, wherein the block storage volume is hosted by one or more storage media in communication with the compute instance over a network, and wherein the device enables the compute instance to submit input/output (I/O) operations to the block storage volume via a local mass storage protocol, the method comprising:

obtaining a performance profile for the block storage volume, the performance profile indicating a target latency for I/O operations on the block storage volume;

obtaining an I/O operation from the compute instance;

submitting the I/O operation to the one or more storage media, wherein the one or more storage media are configured to process the I/O operation and return to the device a result of the I/O operation in a first period of time;

determining a synthetic delay for the I/O operation with a proportional-integral-derivative (PID) algorithm by at least:

calculating a proportional factor that is proportional to a first error value, the first error value reflecting a difference between the target latency and an actual latency required to obtain a result of the I/O operation, the actual latency corresponding to the first period of time, calculating an integral factor that is proportional to a magnitude and duration of past error values for the block storage volume, the past error values reflecting historical deviations of observed latencies for past I/O operations from the target latency, and calculating a derivative factor that is proportional to a rate of change of the past error values, wherein the synthetic delay is calculated based on a combination of the proportional, integral, and derivative factors;

delaying returning the result to the compute instance according to the synthetic delay; and subsequent to the synthetic delay elapsing, providing the result of the I/O operation to the compute instance.

6. The method of claim 5, wherein the performance profile further includes at least one coefficient value for the PID algorithm, and wherein the coefficient value is tuned to induce steady state error within outputs of the PID algorithm.

7. The method of claim 5, wherein the compute instance is one or more of a virtual machine instance or a bare-metal instance.

8. The method of claim 5, wherein the device is a storage client executing on a physical device of the compute instance.

9. The method of claim 5, wherein delaying returning the result to the compute instance according to the synthetic delay comprises delaying submitting the I/O operation to the one or more storage media according to the synthetic delay.

10. The method of claim 5, wherein providing the result of the I/O operation to the compute instance comprises:

prior to completion of the delay, writing the result of the I/O operation to memory accessible to the compute instance; and subsequent to the delay, notifying the compute instance of a presence of the result of the I/O operation within the memory.

11. The method of claim 5, wherein the performance profile includes multiple target latencies associated with I/O operation parameters, and wherein the method further comprises identifying the target latency according to parameters of the I/O operation.

12. The method of claim 5, wherein determining the synthetic delay for the I/O operation by at least applying the PID algorithm to the error value comprises calculating the synthetic delay by modifying a past synthetic delay by an output of the PID algorithm.

13. One or more non-transitory computer-readable media comprising instructions executable by a device facilitating interaction between a compute instance and a block storage volume acting as virtual storage for the compute instance, wherein the block storage volume is hosted by one or more storage media in communication with the compute instance over a network, wherein the device enables the compute instance to submit input/output (I/O) operations to the block storage volume via a local mass storage protocol, and wherein the instructions, when executed, cause the device to:

obtain a performance profile for the block storage volume, the performance profile indicating a target latency for I/O operations on the block storage volume;

obtain an I/O operation from the compute instance;

submit the I/O operation to the one or more storage media, wherein the one or more storage media are configured to process the I/O operation and return to the device a result of the I/O operation in a first period of time;

determine a synthetic delay for the I/O operation with a proportional-integral-derivative (PID) algorithm by at least:

calculating a proportional factor that is proportional to a first error value, the first error value reflecting a difference between the target latency and an actual latency required to obtain a result of the I/O operation, the actual latency corresponding to the first period of time, calculating an integral factor that is proportional to a magnitude and duration of past error values for the block storage volume, the past error values reflecting historical deviations of observed latencies for past I/O operations from the target latency, and calculating a derivative factor that is proportional to a rate of change of the past error values, wherein the synthetic delay is calculated based on a combination of the proportional, integral, and derivative factors;

delay the I/O operation according to the synthetic delay; and subsequent to the delay, provide the result of the I/O operation to the compute instance.

14. The one or more non-transitory computer-readable media of claim 13, wherein to delay the I/O operation according to the synthetic delay, the instructions cause the device to implement at least one of delaying submission of the I/O operation to the one or more storage media according to the synthetic delay or delaying returning of the result of the I/O operation to the compute instance according to the synthetic delay.

15. The one or more non-transitory computer-readable media of claim 13, wherein the target latency corresponds to an average latency of I/O operations of a physical disk drive having a defined interface type.

16. The one or more non-transitory computer-readable media of claim 13, wherein the target latency corresponds to an expected performance of a physical drive type, the physical drive type corresponding to one of a magnetic spinning disk drive or a solid state memory drive.

17. The one or more non-transitory computer-readable media of claim 13, wherein the instructions further cause device to obtain the performance profile for the block storage volume during attachment of the block storage volume to the compute instance.

18. The one or more non-transitory computer-readable media of claim 13, wherein the device is one of a host device hosting the compute instance or an offload card included within the compute instance.

19. The one or more non-transitory computer-readable media of claim 13, wherein the performance profile further includes at least one coefficient value for the PID algorithm, and wherein the coefficient value is tuned to induce steady state error within outputs of the PID algorithm.

20. The one or more non-transitory computer-readable media of claim 13, wherein the performance profile includes multiple target latencies associated with I/O operation parameters, and wherein the instructions further cause the device to identify the target latency according to parameters of the I/O operation.

21. The one or more non-transitory computer-readable media of claim 13, wherein the device is a storage client executing on a physical device of the compute instance.

22. The one or more non-transitory computer-readable media of claim 13, wherein applying the proportional-integral-derivative (PID) algorithm to the error value comprises using the error value to calculate integral and derivative factors for the PID algorithm, and wherein the instructions further cause the device to apply the PID algorithm to a second error value, reflecting an actual latency required to obtain a result of the I/O operation at the device, to calculate a proportional factor of the PID algorithm.

* * * * *